United States Patent Office 3,017,330

Patented Jan. 16, 1962

3,017,330
METHOD OF MAKING DEXTROSE USING PURIFIED AMYLOGLUCOSIDASE

Ralph W. Kerr, Riverside, Ill., assignor to Corn Products Company, a corporation of Delaware No Drawing. Filed Nov. 28, 1958, Ser. No. 776,767
6 Claims. (Cl. 195—11)

This invention relates to a new process for hydrolyzing starch with enzymes wherein the yield of dextrose in the hydrolyzate is increased over prior art processes.

The main object of this invention is to provide an improved method for producing dextrose, or dextrose-bearing syrups, in processes involving the enzymatic hydrolysis of starch, or starch products, by means of amyloglucosidase containing preparations. The primary improvements which result are starch hydrolyzates which contain substantially less undesirable components, or impurities, that add to the burden of refining than are in starch hydrolyzates obtained by enzymatic processes of the prior art, and, in extended hydrolyses, greater potential yields of dextrose in hydrolyzates and greater actual yield of dextrose when the hydrolyzates are refined, concentrated, and crystallized, and the crystallized dextrose is separated from the mother liquors than are obtained from hydrolyzates produced by processes of the prior art. Accordingly, a more specific object of this invention is to provide a commercial process for the production of crystalline dextrose by enzymatic hydrolysis, which will give a higher yield of the sugar than is obtained from processes of the prior art. Other objects will appear hereinafter.

The existence of an ezyme which would hydrolyze starch molecules, or acid converted starch molecules, directly to the monomer, dextrose, has been recognized for at least 15 years.

As early as 1941, Kerr and Schink (Ind. Eng. Chem. 33, 1418 (1941, and later ibid. 34, 1232 (1942)), pointed out the presence of an alpha-glucosidase, in certain fungal extracts, which appeared to break away dextrose units directly from the large polysaccharide molecules in starch prehydrolyzed with acid and that there appeared to be no limit to the action short of complete hydrolysis to dextrose. Although there was disagreement with their findings, this view is now accepted.

During the interval of these early investigations, this hypothetical enzyme has been called by various names by different investigators. It has been called aplha-glucosidase, amyloglucosidase, gluc-amylase, starch-glucogenase and maltase. The last mentioned name was used by some early investigators on the assumption, now known to be erroneous, that the enzyme which produces glucose directly from starch was no different from a previously known enzyme called maltase, which produces dextrose from maltose, but is substrate specific for the disaccharide. Hereinafter, this starch hydrolyzing enzyme will be referred to as amyloglucosidase.

This enzyme occurs in aqueous extracts, or culture filtrates of microorganisms, particularly the fungi. Certain strains of *A. niger,* for example, are a very good source. Naturally, other enzymes from the living cells occur in these extracts also and separation of the amyloglucosidase, even from other carbohydrases, such as the alpha-amylases, transglucosidases and limit dextrinases has until recently presented an insurmountable problem. Indeed, amyloglucosidase is one of a very few remaining carbohydrases that has not as yet been separated in a form sufficiently pure to be crystallized.

In spite of the glowing predictions of some of the early workers in this field that there should be no limit to the hydrolysis of starch, short of complete hydrolysis to dextrose, and that an enzymatic dextrose process should be greatly superior to the conventional acid hydrolysis process in respect to yield of dextrose sugar and in refining problems, data from prior art processes for enzymatically produced dextrose have failed to fulfill these hopes. There have appeared to be problems in the enzymatic process analogous to the acid hydrolysis.

Problems involved in the conventional acid process have been outlined by Kerr (Chemistry and Industry of Starch, second edition, chapter XIV). There is in the acid hydrolysis process the problem of incomplete hydrolysis, due to the greater resistance of the anomalous 1-6 alpha-glucoside linkage in starch to hydrolysis. There is the synthetic action, or reversion, induced by acid whereby dextrose or lower sugars recombine into more acid stable dimers or polymers. These two results alone not only appreciably detract from the potential yield of dextrose in the hydrolyzate but, on crystallization and separation of dextrose from these hydrolyzates, they drastically reduce the actual yield of the sugar obtained (Chem. and Ind. of Starch, p. 385). When starch is hydrolyzed by fungal extracts, inspection of the hydrolyzates shows the presence of substantial quantities of dimers and polymers of dextrose with anomalous linkages, indicating either incomplete hydrolysis or synthetic action, or both.

In the acid hydrolysis process there are "destructive" reactions in which protein or nitrogenous impurities play a part. These reactions and the presence of salts add to the burden of refining the hydrolyzate and contribute to reduced yields of finished sugar. Obviously, when extraneous protein and salts are deliberately added to starch liquors by way of fungal extracts or culture filtrates, it is not surprising that these aforesaid problems in refining and further reduced dextrose yields should be aggravated in the enzymic processes of the prior art.

Several U.S. patents have been granted recently on improved processes of hydrolyzing starch with enzymes; 2,305,168; 2,531,999; 2,583,451; 2,717,852.

When enzymatic dextrose processes of the prior art are employed to hydrolyze starch or starch products, hydrolyzates are obtained which contain no more than about 85 percent dextrose, dry basis, even under optimal operating conditions. Further analysis of these hydrolyzates for total sugars, or reducing substances, as by the well known Lane and Eynon modified Fehlings test, and calculating the result as dextrose equivalent (D.E.) discloses that there is an additional 5 percent or more of nondextrose sugars present and a balance of higher polysaccharides and noncarbohydrate impurities to total 100 percent.

When these hydrolyzates are refined by passing over bone char, filtration and concentration, and are crystallized by orthodox procedures used in the art, yields of crystalline dextrose no higher than about 60 percent, dry basis are obtained. This is substantially the same yield as is obtained in an orthodox acid conversion of starch and using comparable refining and crystallizing procedures. In both cases, the nondextrose solids present in the hydrolyzates have prevented the crystallization of some 25 to 30 percent of dextrose (calculated on a dry basis) known to be present in the hydrolyzate.

When the mother liquors from the enzymatic processes are reconcentrated and recrystallized, a yield of second grade sugar amounting to as high as 20 percent, dry basis, of the original hydrolyzates solids may be realized. Thus, a total yield of sugar as high as 80 percent is obtained. When mother liquors from the acid conversion process are refined, rehydrolyzed by acid, concentrated and crystallized, also an additional yield of second grade sugar as high as 20 percent may be obtained to give a total yield of 80 percent of first and second grade sugar.

Obviously, reconversions, further refining and recrystallizations may be repeated many times to increase the yield above 80 percent in both acid and enzymatic processes but the proportionate cost increases with each repetition.

From a critical examination of the prior art, it is evident that these workers believed that the disappointingly low yield of dextrose found in starch hydrolyzates by enzymic conversion, and that actual yields of crystalline product no higher than in comparable acid hydrolysis processes, were due to one, or to a combination of two or more of the following:

(1) That the dextrose producing enzyme, per se, was incapable of carrying the conversion to any higher level; that is, that there was a "limit of conversion" analogous to the limit obtained with the maltose producing enzyme, beta-amylase.

(2) That the "limit of conversion" varied with the source of the amyloglucosidase and that higher dextrose yields could be obtained, possibly, by finding a fungal extract with a higher "conversion limit."

(3) That the dextrose producing enzyme was a maltase, substrate specific for maltose or lower polysaccharide, and accordingly, the dextrose yield from starch would depend entirely on the presence in the fungal extracts of other enyzmes known to produce maltose, e.g., alpha-amylase.

(4) That because of conditions necessarily applied in practice for reasons of economy, or for some other reason, in one or more stages of the production process for making dextrose, no higher yields of dextrose could be obtained than those actually found. Such conditions contemplated were, for example, concentration of starch or starch product used for hydrolysis by the enzyme; the degree or manner in which the starch was pretreated prior to enyzme hydrolysis, as for instance, with acid; the pH, temperature and other variables of the enzymic hydrolysis and the manner in which the fermentation was carried out to produce the fungal extract.

(5) That although one function of the amyloglucosidase molecule is to hydrolyze starch to dextrose, this action was as a transferase and accordingly, this same enzyme molecule might be expected to exhibit transglucosidase activity as a secondary function, which would be anticipated to reduce the dextrose yield.

Any and all of these and similar theories are in marked contrast to the discoveries which underlie the present invention.

I have found that the amyloglucosidase molecule possesses only one function which is to hydrolyze the linkages of starch molecules so as to produce dextrose and that all other enzymes present in fungal extracts (or all other enzymic activity) may be separated from this amyloglucosidase molecule. I have found that amyloglucosidase attacks the nonreducing terminal ends of starch molecules, splits off dextrose directly from these terminals and proceeds thus along the starch molecule until it is substantially completely hydrolyzed to dextrose. Lesser yields in starch hydrolyzates obtained by use of crude fungal extracts containing the amyloglucosidase are, accordingly, due to other, interfering enzymes, including transglucosidases, which give final products other than dextrose. When starch or starch products are hydrolyzed by "purified" extracts which contain only amyloglucosidase activity and yields short of 100 percent are obtained and hydrolyzates so produced still present certain refining problems, this result is due primarily to extraneous protein and salts that are added with the "purified" extract and eventually become a part of the hydrolyzate.

In my copending patent applications, Serial No. 705,828, now U.S. Patent 2.967,804, dated January 10, 1961, and Serial No. 705,819, now U.S. Patent 2,970,086, dated January 31, 1961, I have shown two effective methods for purifying culture extracts of fungi so as to obtain by hydrolysis, substantially increased yields of crystalline dextrose from starch or starch products, compared with enzymatic processes of the prior art. The purification method of preference for amyloglucosidase given in Serial No. 705,828, now U.S. Patent 2,967,804, is based on my discovery that the amyloglucosidase molecule has the very unique property of being soluble in aqueous solutions of water miscible solvents only over a very limited and extremely small range of electrolyte concentration, e.g. NaCl, whereas the solubility of other enzymes in culture extracts and of nearly all other imprities, is not so critically affected by traces of electrolytes. Although this method is highly effective in producing a pure amyloglucosidase, so as to obtain significantly higher yields of dextrose from starch, this purification method involves certain undesirable technical problems in the recovery and reuse of the water miscible solvent, such as for example acetone or alcohol, in order to make the process economically practicable. Moreover, the use of large amounts of volatile and inflammable solvents introduces an industrially hazardous step. The purification method of choice given in my copending patent application Serial No. 705,819, now U.S. Patent 2,970,086, is to treat a solution of the amyloglucosidase with an adsorbent that will remove undesirable impurities from the amyloglucosidase. The preferred adsorbent, Magnesol, will for example, under the conditions described, effectively remove the most undesirable enzymatic impurity, the transglucosidase, which is present in most fungal extracts, and which causes the synthesis of unwanted saccharides during the hydrolysis of starch to dextrose by the amyloglucosidase. The Magnesol also removes some nonenzymatic impurities, when they are present, e.g., certain proteinaceous material. However, when this purified amyloglucosidase was used to hydrolyze starch, in many cases it was noted that the dextrose crystals obtained as the product by conventional refining methods frequently had a faint odor, reminiscent of the odor-bearing constituents of the original culture filtrate. In many uses for crystalline dextrose even the faintest trace of foreign odor would be objectable. Accordingly, use of this process frequently involved an additional and costly added step to treat the dextrose to remove this odor.

I now have discovered that many of the disadvantages pertaining to prior art processes, and to those given for my two copending processes for producing dextrose and dextrose bearing syrups from starch can be largely overcome by utilizing an amylogucosidase which has been substantially purified by so called chromatographic principles. I have made the discovery that in solutions of amyloglucosidase, the amyloglucosidase enzyme molecule has a rate of migration on a bed of cellulosic material, such as alpha-cellulose or paper pulp, in contact with the solution, that is quite different from substantially all other impurities present in fungal extracts and that these differences in migration rates are of such magnitude that the amyloglucosidase can be effectively separated in substantially pure form by a relatively simple operation, and that the use of this purified amyloglusosidase to hydrolyze starch to dextrose gives an exceptionally high yield of "first" grade crystalline dextrose by use only of conventional and low cost refining methods for the starch hydrolyzate. By use of my improved process for producing dextrose, more completely set forth hereinafter, I have obtained hydrolyzates of starch which my analysis showed reducing sugars, calculated as dextrose (dextrose equivalent, D.E.), of 95 to 96 percent, dry solids basis, and an actual dextrose content of 93 to 94 percent, dry basis, and from which hydrolyzate a yield of 85 percent of very high purity dextrose was obtained. This yield of dextrose is at least 20 percent greater than is obtained from starch by orthodox, acid conversion processes, using a single stage acid conversion and comparable refining procedures, and 5 to 10 percent, or more, greater than is obtained in enzyme processes of the prior art.

In a preferred embodiment of my invention, the amyloglucosidase is purified for use in hydrolyzing the starch by passing a crude solution of the enzymes, in a liquid in which the enzyme is soluble, over a column of finely divided cellulose. As the solution containing the dissolved amyloglucosidase passes over the column, as for example in a downward direction by gravity, the impurities which migrate at faster and at slower rates than the pure amyloglucosidase become separated into zones which become progressively further removed from the amyloglucosidase as the liquor travels down the column. As these zones emerge from the column they are collected in separate vessels, by a procedure and collection device which may be automatic and the zone containing the purified amyloglucosidase is thus separated from substantially all other impurities. Addition to the enzyme solution of trace amounts of soluble coloring matter that has the same, or nearly the same migration rate as the amyloglucosidase under the conditions employed, materially assists in locating the desired fraction in the series of eluates taken by the automatic collector. The zone collected that contains the pure enzyme may of course be positively identified by testing for amyloglucosidase activity, by its ability to hydrolyze starch to dextrose.

When liquids are used for the chromatographic separation, that are good solvents for the enzyme, such as water, then migration of the amyloglucosidase, and of other highly soluble impurities, may be so rapid that the various zones are not satisfactorily separated from each other on the chromatogram. Accordingly, in my preferred procedure I use poorer solvents for the enzyme such as for example, aqueous solutions of water-miscible liquids, such as, alcohols or acetone that are, individually, nonsolvents for the enzyme. I have found that a solution comprising water and acetone in about equal portions by volume is a solvent for the amyloglucosidase that leads to a reasonably wide separation of the zone on the chromatogram containing the amyloglucosidase from zones containing undesired constituents of the fungal extract, both enzymatic and non-enzymatic. This feature of my discovery is demonstrated more particularly in EXAMPLES 3 and 4, wherein conventional paper strip chromatography is used for demonstration in preparing the chromatogram.

Naturally, in view of the teachings in my copending application, Serial No. 705,828, now U.S. Patent 2,967,804, it follows that when poorer solvents for the enzyme are employed as in larger scale column chromatography, such solvents for example as the aqueous acetone referred to above, then the electrolyte concentration of the solution should preferably be kept below the critical level at which precepitation of the amyloglucosidase from the aqueous acetone occurs.

In the separation and purification of amyloglucosidase by chromatographic principles by use of large scale equipment, such as a column of powdered cellulose, as more particularly set forth in EXAMPLE 5, hereinafter, this process step may, optionally, be made continuous, when, after a semi-continuous run, the rate of migration of the amyloglucosidase has been established in a particular solvent developer, on a particular chromatographic bed, and for a particular developer flow-rate under a given hydrostatic head. Optionally also, collection of the effluent fractions, and in particular, the fraction containing the purified amyloglucosidase, may be made automatic by the use of automatic, fractional sample collectors, devices that are well known in the art of column chromatography.

Optionally, the composition of the solvent that is used as developer for the chromatogram by which the amyloglucosidase is separated from other constituents, need not be the same as of the solvent used for elution. For example, an aqueous alcohol solution may be used as a developer whereas a solution of entirely different composition, and in which the amyloglucosidase is more soluble, may be used for elution.

By means of the above-described purification technique, I have obtained amyloglucosidase which has been purified to the extent that when about 10 to 15 units of such amyloglucosidase per 100 grams of substrate are added to an aqueous dispersion of starch substance at pH 4.0 and 60° C. and such hydrolyzates after 72 hours are compared with those where the enzyme has not been purified, the dextrose equivalent (D.E.) of the hydrolyzate using the purified enzyme will be increased by about 2 to about 7 percent dry basis and the dextrose content in the hydrolyzate using the purified enzyme will be increased by about 3 to about 10 percent dry basis compared to the hydrolyzate produced by the said enzyme without the purification, the conditions of hydrolysis being otherwise the same.

Amyloglucosidase activity units are determined as follows: The substrate is a 15–18 D.E. acid hydrolyzate of corn starch dissolved in water and diluted to 4.0 grams of dry substance per 100 ml. of solution. Exactly 50 ml. of the solution is pipetted into a 100-ml. volumetric flask. To the flask is added 54.0 ml. of pH 4.3, 1.0 molar sodium acetate-acetic acid buffer. The flask is placed in a water bath at 60° C. and after 10 minutes, the proper amount of enzyme preparation is added. At exactly 120 minutes after addition of the enzyme preparation, the solution is adjusted to a phenolphthalein end-point with one normal sodium hydroxide. The solution is then cooled to room temperature, and diluted to volume. A reducing sugar value, calculated as dextrose, is determined on the diluted sample and on a control with no enzyme preparation added. Amyloglucosidase activity is calculated as follows:

$$A=\frac{S-B}{2\times E}$$

where $A$=amyloglucosidase activity units per ml. or per gram of enzyme preparation.

$S$=reducing sugars in enzyme converted sample, grams per 100 ml.

$B$=reducing sugars in control, grams per 100 ml.

$E$=amount of enzyme preparation used, ml. or grams.

The reducing sugar concentration in the enzyme-converted sample should be not more than 1.0 gram per 100 ml.

All varieties of starch, or starch products and amylaceous materials may be used in my process employing amyloglucosidase for hydrolysis. Preferably, however, for dextrose sugar production, a pure starch should be used and, pureferably, for economic reasons, a pure starch which is already partially hydrolyzed or converted by some means so as to reduce the very high viscosity of the native starch when it is dispersed or dissolved in water. Reduction in viscosity facilitates the use of higher solids content of starch substance in the amyloglucosidase hydrolysis. Pretreatment of the starch may be made in any number of known ways, as by preliminary acid hydrolysis, pretreatment with a purified alpha-amylase which acts very much the same as acid on starch in the initial phases of the hydrolysis, at least, or pretreatment by physical means, such as passing the paste through a Votator machine, a Therminuter cooker or homogenizer. The pretreatment may be a combination of two or more procedures as, for example, acid under pressure or using an alpha-amylase treatment combined with passage through a Votator machine. In any event, the pretreatment should be suitable to reduce the viscosity of substrate to a level so that workable fluids are obtained at a solids concentration of from between 25 to 50 percent, by weight, and, preferably, at a level of about 35 percent solids when the temperature of the liquor is in the range of about 45 to 60° C. However, this pretreatment should not be extended beyond the level above indicated or otherwise any undesirable features of the hydrolysis or conversion used in the preliminary treatment may superimpose upon the results obtained in the amyloglucosidase hydrolysis which follows.

Thus, for example, in a preferred embodiment of this invention, starch is converted with very dilute acid under pressure in the orthodox manner of making a starch syrup and the syrup at about 35 percent solids concentration is hydrolyzed to dextrose with purified amyloglucosidase. When the starch is so converted in comparatively thin dispersions to the level of about 10 to 20 D.E. (dextrose equivalent), the product may be made up for amyloglucosidase hydrolysis at the preferred concentration and, by use of the amyloglucosidase, purified as described herein, hydrolyzates having a dextrose content in the exceptionally high range of 90 to 98 percent, dry basis, will be obtained. However, if the acid treatment is considerably more extensive, then, even though more concentrated solutions may be used, nevertheless, the amyloglucosidase hydrolysis will not appear to have been as complete because the acid has produced a certain amount of enzyme-resistant reversion products in the more extended phases of the acid treatment.

In any event, the starch substrate should be dispersed in water and the solution should be adjusted to an acidity level and temperature should be selected so that the amylogucosidase may complete the hydrolysis in the shortest time and with the best economy in respect to the amount of enzyme used. Acidity and temperature are interdependent variables. Soda ash, sodium hydroxide, and the like are suitable alkaline materials and hydrochloric is a suitable acid for making these adjustments of the pH level of the liquors for amyloglucosidase hydrolysis.

The optimum temperature for hydrolysis with pure amyloglucosidase is within the range of 35 to 60° C. although the optimum temperature is dependent upon the pH as is the case with many other enzymes. Conversely, the pH optimum range, which broadly is about 4 to 6.5 is dependent upon temperature. In general, optimal rates of hydrolysis for pure amyloglucosidase will be obtained in the lower pH range of 4 to 5 when the temperature employed is in the lower range of 35 to 45° C., and as the temperature is increased, optimal rates will be obtained by increasing the pH level accordingly.

In the hydrolysis of starch or starch products with amyloglucosidase to produce dextrose, a further limitation is imposed in regard to pH level and temperature because of the lessened stability of the product, dextrose, at higher pH levels and higher temperatures. Accordingly, in carrying out the teachings of this invention, the preferred operating ranges for hydrolysis with amyloglucosidase are a pH range of 4.0 to 4.8 and a temperature range of 45 to 60° C.

The length of time for the starch hydrolysis will depend upon several operating variables. Most important of these are ratio of amyloglucosidase to substrate, pretreatment of the starch, addition of assisting enzymes, the temperature and pH levels employed and the substrate concentration. However, and in any case, the hydrolysis may be followed in practice by analytical determinations well known in the art such as, for example, the method of Sichert-Bleyer for the determination of dextrose, and the hydrolysis is continued until by analysis it is apparent that the action of the amyloglucosidase has been substantially completed under the operating conditions chosen, that is, the concentration of dextrose in the hydrolyzate has reached an optimum. In general, a practical optimum will be when the soluble solids in the hydrolyzate are found by analysis to be 90 to 98 percent dextrose on a dry basis. The length of time required to arrive at this optimum will vary between about 10 and 90 hours, depending on operaitng variables, such as those above discussed. A convenient operating range of purified amyloglucosidase addition is from about 10 to about 20 amyloglucosidase activity units per 100 grams of starch substrate, or about 45 to 90 units per pound of starch.

Following the hydrolysis stage of the process, the hydrolyzate is refined, concentrated, crystallized and centrifuged to recover the crystalline dextrose in pure form by use of equipment and general procedures well known in the glucose refining industry, taking into account that the hydrolyzates produced in accordance with this invention have lower concentrations of colored bodies, electrolytes and other impurities and correspondingly higher concentrations of dextrose and represent refined hydrolyzate liquors which crystallize more readily and more completely than hydrolyzates of the prior art.

The following examples which are typical and informative only will further illustrate the invention.

*Example 1*

In a preferred embodiment of my invention, corn starch, which has been thoroughly washed, made up to 10° Bé. with water and adjusted to approximately 0.02 normal with hydrochloric acid is converted in an autoclave at 20 p.s.i. steam pressure until the conversion liquor is approximately 17 D.E., that is, the reducing value of the dissolved solids in the liquor, as measured by a modified Fehling's test (Fetzer, W. J., Analytical Chem. 24, 1129–1137 (1952), references Nos. 37 to 41), and the results calculated as dextrose, is 17 percent, dry basis. The liquors are then treated with 0.5 percent, dry basis, bentonite and filtered on a filter precoated with Dicalite filter aid. The liquors are adjusted to pH 4.5 and concentrated by evaporation under reduced pressure to approximately 36 percent dry substance. The liquors, adjusted to 60° C. and pH 4.5, are treated with a quantity of purified amyloglucosidase equal to 90 units per pound of dry substance starch which is sufficient so that the reducing value of the liquor as D.E. and the dextrose yield, dry basis, will reach maximal values in approximately 48 hours. These maximal values are D.E. 95 to 96 and the dextrose yield by the Sichert-Bleyer test (Sichert, K. and Bleyer, B., Z. Anal. Chem., 107,328 (1936)) is 93 to 94 percent, dry basis. The amyloglucosidase is purified by the column chromatographic method as given in Example 5.

The dextrose-containing liquors, now at 50 to 55° C., possess much less color, less taste, less protein and less salt content than conversion liquors from acid hydrolysis processes or enzymatic processes of the prior art for producing dextrose, but are none the less treated with 1 percent carbon, filtered, and evaporated to about 70 to 75 percent dry substance before passing to the crystallizer. Because of the higher purity of these liquors, compared to crystallizer liquors from prior art processes, the dextrose tends to crystallize much more readily, which characteristic necessitates the use of a slightly less concentrated liquor than is commonly used in orthodox dextrose crystallization procedures. An initial temperature of approximately 42° C. (108° F.) is employed in the crystallizer, with the usual addition of dextrose seed crystals, and the liquors are cooled with stirring over a period of two days to about 16 to 18° C. The liquors are then centrifuged to recover the dextrose crystals and the liquors are additionally crystallized by evaporation to about 75 to 80 percent dry substance content and stirring while cooling over a temperature range of from 42 to 18° C. during a 4-day period. Yields of very high purity, crystalline dextrose in excess of 85 percent result from this process which is at least 20 percent more dextrose than is obtained from starch by orthodox, acid conversion processes, using a single stage acid conversion and comparable refining procedures, and 5 to 10 percent or more, than is obtained in enzyme processes of the prior art.

*Example 2*

In a second embodiment of my invention, well washed corn starch made up in water to a concentration of 35 percent by weight and at pH 6.5 is mixed with a relatively pure alpha-amylase preparation obtained from a thermophilic bacteria, such as for example, *B. subtilis*, passed through a Votator at about 88 to 90° C. and then held for approximately 30 minutes at about this temperature before being cooled to 60° C. The amount of alpha-amylase added is sufficient to reduce the viscosity of the gelatinized starch to a level where it is a workable fluid at 60° C. This viscosity is not critical. The acidity of the liquor is adjusted to pH 4.0 by adding hydrochloric acid and 60 units of a purified amyloglucosidase preparation is now added per pound of dry substance starch which is sufficient in amount so that by ho'ding the starch enzyme mixture for 3 days at a temperature 55 to 60° C. a maximal D.E. is obtained in the resulting hydrolyzate liquor which is of the order of 95. The purified amyloglucosidase used is prepared from *A. niger* culture filtrates by the chromatographic method given in Example 4. The liquors are filtered and then are refined, concentrated by evaporation, crystallized and centrifuged to recover the crystalline dextrose in pure form. Purity and yie'ds are comparable to those obtained in the first given procedure.

*Example 3*

The following example is given to show the separation of carbohydrases that are present in culture filtrates of fungi by utilizing the principles of paper strip chromatography. A drop of an extract of *A. niger* culture, low in electrolyte concentration, was placed on a strip of Schleicher and Schuell (No. 507) paper at a distance of 100 mm. (the origin) from one end, and the strip was air-dried. The end of the paper strip nearest the origin was immersed in 50 percent by volume aqueous acetone in a closed chamber at 25° C. The dry section of the paper was suspended vertically and so that the solvent would flow in downwards direction. The solvent boundary moved along the paper strip to a distance of 375 mm. in 16 hours. At the end of this time the paper strip was removed and dried and it was then tested as follows. A gel was made by dissolving one gram of Lintner soluble starch and 2 grams of agar in 100 ml. of hot water, adding several milligrams each of calcium and sodium dihydrogen phosphate as the sol cooled, in order to adjust the acidity to pH 4.5, and casting the gel in a flat dish. When the gel had set the paper strip with the developed chromatogram was pressed against the gel and held for 20 hours at 25° C. The strip was removed and the surface of the gel was flooded momentarily with 0.01 molar iodine solution in order to detect localities where the starch had been hydrolyzed. There were two bands where hydrolysis of starch was pronounced, as judged by failure to form an intense blue color with the iodine. One band was at an average distance of 250 mm. from the origin and here the color was quite white; the apparent $R_F$ value is accordingly, 250/375 or 0.67 for the enzyme or enzymes in this band. The other pronounced band was at an average distance of 182 mm. from the origin and the color was a weak bluish purple; the apparent $R_F$ value for this band is 0.49. Subsequent tests disclosed that the glucose producing enzyme was in the slower moving band, and carbohydrases splitting starch molecules by random attack (with rapid loss of blue color formation with iodine) were in the much faster moving band.

*Example 4*

Paper chromatographic separations were made by procedures similar to those described in Example 3, using much larger amounts of dry substances culture extract in order to provide samples for larger scale starch hydrolysis and for further testing of hydrolyzates. The same culture extract was used as was employed in Example 3. Concentrations of the extract were built up on the paper by placing the culture extract on the paper, at the origin, drying and making another addition of the extract at the origin. This was repeated four times. The prepared paper was developed, using 50 percent by volume aqueous acetone as in Example 3. Three strips of the developed chromatogram were tested by the agar plate method, also given in Example 3, from which $R_F$ values of 0.44, 0.46 and 0.43 for the slower carbohydrase band were calculated and R values of 0.63, 0.65 and 0.63 for the faster moving band. Sections of paper chromatograms were cut containing the slower moving band and these were placed in a water solution of starch which had been hydrolyzed by acid to a dextrose equivalent (D.E.) of 17 percent, dry basis, neutralized and dried. Hydrolysis was allowed to proceed at pH 4.0 and 60° C. for 72 hours. Periodic samples were removed for testing. These tests made on the starch hydrolyzates were for dextrose content (to demonstrate the presence of amyloglucosidase), for change in wavelength of iodine color by spectrophotometry (to show the purity of the amyloglucosidase) and by paper chromatographic analysis for sugars (in order to detect transglucosidase activity in the production of synthetic sugars). These tests showed that the paper sections eluted contained amyloglucosidase, substantially free from transglucosidase and free from carbohydrases that attack starch molecules in random fashion, such as for example, alpha-amylase.

From the above, and other experiments it is apparent that the $R_F$ value for amyloglucosidase in a poor solvent such as 50 percent aqueous acetone depends within limits at least on the electrolyte concentration, measureably increasing in value as the electrolyte concentration approaches zero. At almost zero electrolyte concentration, the $R_F$ value in the aqueous acetone solution may approach 0.5 but as the concentration of a neutral salt, such as for example, sodium chloride (which may be present in culture extracts) approaches a value of about 0.2 percent in, for example, 50 percent aqueous acetone, the $R_F$ value of amyloglucosidase approaches zero, since this enzyme is substantially insoluble in 50 percent aqueous acetone at or above a sodium chloride concentration of about 0.2 percent and the amyloglucosidase will, accordingly, remain at the origin of the chromatogram under these conditions.

In a chromatographic separation of the type described in Example 3, wherein a drop of a culture extract that contains some soluble electrolyte is placed on a strip of paper and dried, and then the end of the paper strip nearest the origin is placed in 50 percent aqueous acetone to develop the chromatogram, the apparent $R_F$ value of the amyloglucosidase will vary, particularly over the initial intervals of the run, and will not approach the true $R_F$ value until a sufficient amount of advancing solvent has washed the electrolyte out of the original deposit of culture extract placed at the origin on the paper strip. The apparent, or observed $R_F$ value in poor solvents in the presence of a soluble electrolyte, will therefore, be a summation of increasing $R_F$ values. Nevertheless, these apparent $R_F$ values are reproducible with reasonable precision, when operating conditions are fixed in replicate runs, as is shown in Example 4.

*Example 5*

A dialyzed and concentrated extract of a culture of *A. niger*, relatively high in amyloglucosidase content, was mixed with an equal volume of acetone and the mixed solution was placed at the top of a column of powdered alpha-cellulose, completely submerged in 50 percent by volume aqueous acetone. The column was of a length and of other characteristics such that the solvent boundary of 50 percent by volume aqueous acetone required approximately 5 hours to pass down the column and through a valve at the bottom, when a hydrostatic head of about 3 inches of the aqueous acetone was maintained above the column. As soon as the enzyme solution had passed into the column, a supply of 50 percent aqueous acetone was added to develop the chromatogram on the alpha-cellulose column, a valve at the bottom of the column being opened to receive the issuing solvent. When carbohydrases more rapidly moving than amyloglucosidase had passed down the length of the column and were about to be discharged, water was substituted as eluent at the head of the column in place of the aqueous acetone developer, in order to produce an aqueous preparation of amyloglucosidase, substantially free of other carbohydrases, including transglucosidase. Relatively small proportions of acetone remaining in the aqueous preparation were removed by distillation under reduced pressure at 25° C. before using the purified amyloglucosidase to hydrolyze starch.

I claim:

1. In a process for producing dextrose from starch wherein the starch in aqueous system is hydrolyzed with an amyloglucosidase containing enzyme preparation to maximal D.E. and true dextrose contents, the hydrolyzate is clarified, concentrated by evaporation, and allowed to crystallize, and the crystallized dextrose is separated from the mother liquor, the improvement which consists in hydrolyzing the starch with an amyloglucosidase containing enzyme preparation which has been purified by developing upon a cellulosic bed a chromatogram from an aqueous solution that contains amyloglucosidase, and using as a developing agent a liquid that is a solution in water of a water-miscible non-solvent for the enzyme, and thereafter eluting from the chromatogram the portion thereof consisting essentially of the amyloglucosidase in purified form; said hydrolysis resulting in a final hydrolyzate which has maximal D.E. values of about 93 to 96 percent and maximal true dextrose contents of about 87 to 94 percent, dry basis.

2. Process according to claim 1 wherein said enzyme preparation in aqueous solution is pretreated with about 0.5 to about 2 percent of a water insoluble hydrous synthetic magnesium silicate, at a pH of about 3.8 to about 4.5, the mixture centrifuged and the liquid phase containing amyloglucosidase is subjected to said purification in order to separate the amyloglucosidase in substantially pure form.

3. A process for purifying an amyloglucosidase containing enzyme preparation which comprises developing upon a cellulosic bed a chromatogram from an aqueous solution containing said amyloglucosidase and using as a developing agent a liquid which is a solution in water of a water-miscible non-solvent for the enzyme, and thereafter eluting from the chromatogram with an aqueous solvent for the amyloglucosidase the portion thereof consisting essentially of the amyloglucosidase in purified form.

4. In a process for producing dextrose from starch wherein the starch in aqueous system is hydrolyzed with an amyloglucosidase containing enzyme preparation to maximal D.E. and true dextrose contents, the hydrolyzate is clarified, concentrated by evaporation, and allowed to crystallize, and the crystallized dextrose is separated from the mother liquor, the improvement which consists in hydrolyzing the starch with an amyloglucosidase containing enzyme preparation which is free of other amylases and transglucosidase by developing upon a cellulosic bed a chromatogram from an aqueous solution that contains amyloglucosidase, and using as a developing agent a liquid that is a solution in water of a water-miscible non-solvent for the enzyme, said non-solvent being a member selected from the group consisting of alcohol and acetone, and thereafter eluting from the chromatogram the portion thereof consisting essentially of the amyloglucosidase in purified form; said hydrolysis resulting in a final hydrolyzate which has maximal D.E. values of about 93 to 96 percent and maximal true dextrose contents of about 87 to 94 percent, dry basis.

5. Process according to claim 4 wherein said enzyme preparation in aqueous solution is pre-treated with about 0.5 to about 2 percent of a water insoluble hydrous synthetic magnesium silicate, at a pH of about 3.8 to about 4.5, the mixture centrifuged and the liquid phase containing amyloglucosidase is subjected to said purification in order to separate the amylogluoscidase in substantially pure form.

6. A process for purifying an amyloglucosidase containing enzyme preparation which comprises developing upon a cellulosic bed a chromatogram from an aqueous solution containing said amyloglucosidase and using as a developing agent a liquid which is a solution of a water-miscible non-solvent for the enzyme, said non-solvent being a member selected from the group consisting of alcohol and acetone, and thereafter eluting from the chromaogram with water as a solvent for the enzyme, the portion thereof consisting essentially of the amyloglucosidase in purified form.

References Cited in the file of this patent

UNITED STATES PATENTS

| | | |
|---|---|---|
| 2,594,356 | Schwimmer et al. | Apr. 29, 1952 |
| 2,717,852 | Stone | Sept. 13, 1955 |
| 2,882,115 | Liggett et al. | Apr. 7, 1959 |
| 2,893,921 | Langlois et al. | July 7, 1959 |

OTHER REFERENCES

Cereal Chemistry, March 1949, pages 98–109, vol. 26.
"Methods in Enzymology," Academic Press Inc., N.Y. (1955), vol. 1, pages 98–125.

UNITED STATES PATENT OFFICE

CERTIFICATE OF CORRECTION

Patent No. 3,017,330 January 16, 1962

Ralph W. Kerr

It is hereby certified that error appears in the above numbered patent requiring correction and that the said Letters Patent should read as corrected below.

Column 6, line 19, for "54.0" read -- 5.0 --; line 48, for "pureferably" read -- preferably --; column 7, line 70, for "operaitng" read -- operating --; column 12, line 35, for "chromaogram" read -- chromatogram --.

Signed and sealed this 1st day of May 1962.

(SEAL)
Attest:

ERNEST W. SWIDER
Attesting Officer

DAVID L. LADD
Commissioner of Patents